United States Patent
Burns et al.

[11] Patent Number: 6,055,934
[45] Date of Patent: *May 2, 2000

[54] ANIMAL WATERER

[76] Inventors: Mary V. Burns, 844 Bell St., Reno, Nev. 89503; Don L. Evans, 1405 Huntington Cir., Reno, Nev. 89509

[*] Notice: This patent is subject to a terminal disclaimer.

[21] Appl. No.: 09/141,468

[22] Filed: Aug. 27, 1998

Related U.S. Application Data

[63] Continuation of application No. 08/643,985, May 7, 1996, Pat. No. 5,799,609.

[51] Int. Cl.⁷ .............................. A01K 7/00; B05B 17/08
[52] U.S. Cl. ................................ 119/74; 239/23
[58] Field of Search ............... 119/51.5, 58, 61, 119/74, 75; 239/17, 18, 23

[56] References Cited

U.S. PATENT DOCUMENTS

| | | | |
|---|---|---|---|
| 2,877,051 | 3/1959 | Cushman et al. | 239/17 |
| 3,409,223 | 11/1968 | Gosh | 239/17 |
| 5,207,182 | 5/1993 | Lorenzana | 119/75 |
| 5,326,032 | 7/1994 | Quillin | 239/17 |
| 5,501,178 | 3/1996 | Kemp | 119/74 |

*Primary Examiner*—Peter M. Poon
*Assistant Examiner*—Elizabeth Shaw
*Attorney, Agent, or Firm*—Ian F. Burns

[57] ABSTRACT

A device is disclosed which comprises a drinking fountain for animals in the configuration of a free falling stream of water, or continuous waterfall. A pump moves water from a reservoir upward to a discharge ramp, or ramps, where water spills over into a receptacle. The reservoir and receptacle may consist of the same part. The cascade of water takes advantage of a preference demonstrated by animals for moving drinking water. The waterfall action also aerates the water and increases freshness, by breaking the surface tension of the standing water and drawing in oxygen from the atmosphere. Filtration of the circulating water in this self-contained system is easily accomplished.

14 Claims, 2 Drawing Sheets

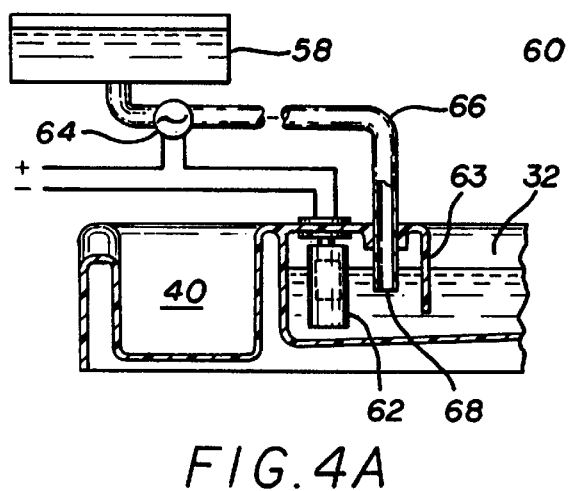
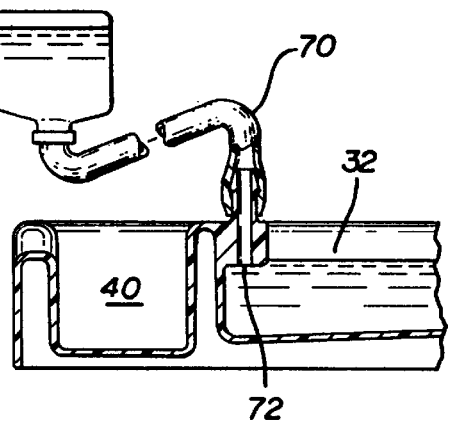
FIG.4A  FIG.4B
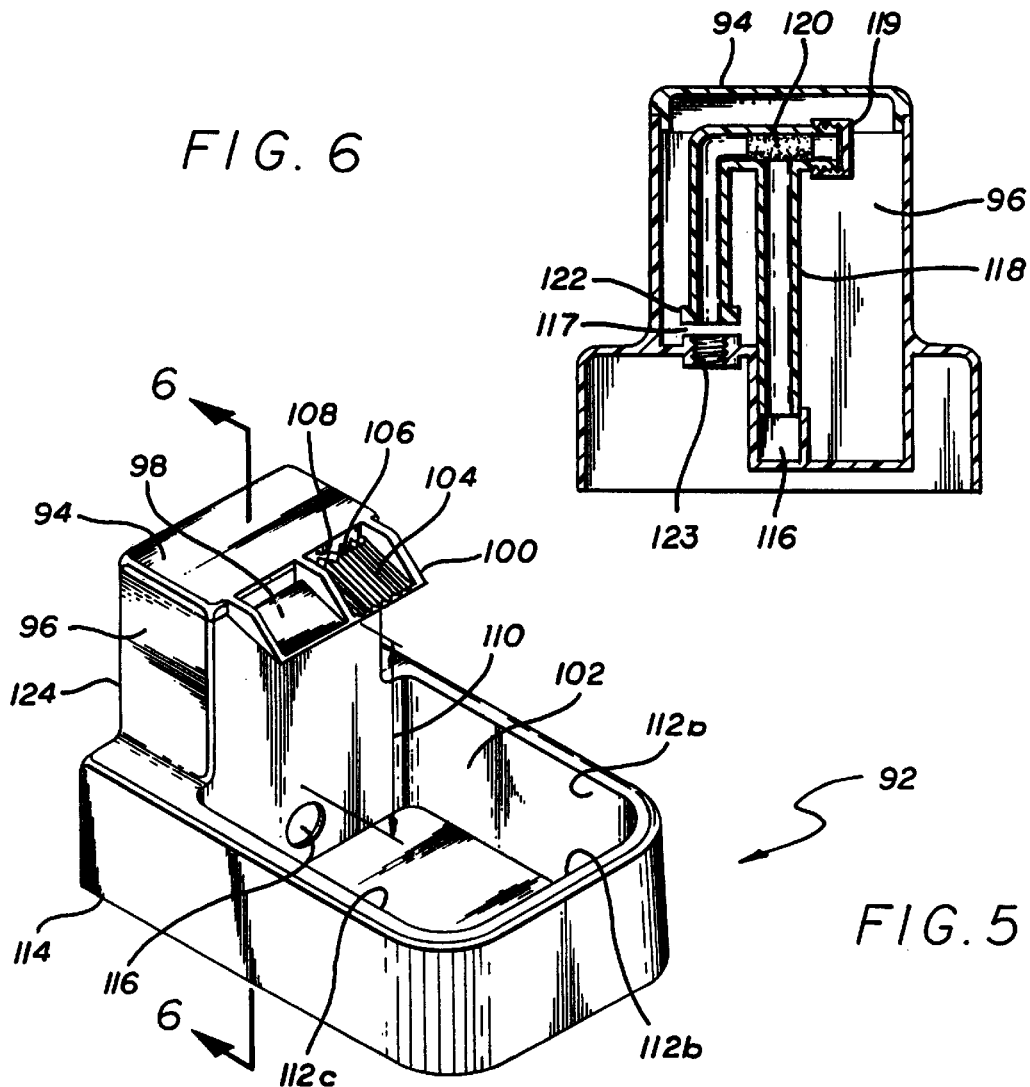
FIG.6
FIG.5

ANIMAL WATERER

CROSS REFERENCE TO RELATED APPLICATIONS

This is a continuation application of application Ser. No. 08/643,985, filed on May 7, 1996 now U.S. Pat. No. 5,799,609.

TECHNICAL FIELD

This invention relates to animal watering devices, specifically to a means for providing free falling, continuous running water for animals.

BACKGROUND OF THE INVENTION

By their actions, household pets have demonstrated a preference for running water. In dogs this is seen as an attempt to drink from a recently flushed toilet or from a running garden hose. In cats this preference for moving water manifests itself through the habit of jumping up onto counters by the sink in the kitchen or bathroom, or jumping into bathtubs or showers. This particular behavior creates access to dripping faucets, which leak or are left on by the animal's owner. Some cats also are drawn to flushing toilets, garden hoses, and decorative fountains. Cats seem especially attracted to free falling water.

The traditional bowl of standing water does not address this fascination because of lack of movement and stagnation or staleness. Animals appear to instinctively know that moving water is fresher. Turbulence causes aeration by breaking the surface tension of standing water and drawing oxygen into it from the atmosphere (as evidenced by bubbles in the water). This turbulence and resulting aeration is most effectively created by a stream of water falling into a body of water.

Pet owners frequently complain about drinking habits as causing a nuisance. These problems, not known to be addressed in the prior art, include: continual begging by cats for faucets to be turned on; owners having to remember to turn faucets off; faucets which are left running waste water and increase water bills; and jumping up on counters which is particularly objectionable in the kitchen, where counters are food preparation areas. Clearly, a solution is needed.

Other considerations specific to cats are the prevalence of Feline Urologic Syndrome (FUS) which creates urinary tract obstruction by mineral crystals, and of kidney disease which often leads to renal failure. It has been demonstrated that easy access to running water causes some cats to drink more than they normally would from a bowl of standing water. The importance of increased water intake and optimal hydration is to:

a) create a more dilute urinary output which minimizes crystal formation and possible obstruction; and b) maintain blood pressure at optimal levels to support the filtering duties of diseased kidneys.

The purposes of a continuously running, free falling waterfall device are to: support the natural attraction to drinking water in this configuration; decrease inconvenience to the pet owner; decrease unhealthful practices in the kitchen; and to encourage water intake through enticement. The device allows this enticement to be present at all times and does not rely on activation by the animal. Cats don't have to wait for faucets to be turned on while the owners are away, at work, or sleeping at night. This ready availability also contributes to proper water intake for feline medical patients. Drinking more water decreases the incidence of life threatening FUS obstruction, decreases the expense of medical treatment of both FUS and kidney disease, and decreases the need for subcutaneous fluids to be administered at home by the owner.

DISCUSSION OF PRIOR ART

The field of animal watering devices is well represented in the prior art. The results commonly encountered may be grouped together as: a) continuous water movement coupled with a demand system; b) demand system waterers in which the water moves only after activation by the animal; c) motionless water which is automatically maintained at a constant level; and d) other or miscellaneous results. Patents of the prior art have not addressed the problems set forth in the above section. Reasons why the prior art has failed to solve these problems are stated in this section.

The best example of continuous water movement coupled with a demand system is U.S. Pat. No. 3,777,714 Danielsson which discloses an animal watering device for suckling pigs, where the animal activates a continuous water flow by sucking a valve. Prior to that age, as newborns, the pigs drink from a bowl which is filled by continuous dripping from the same valve, said valve being connected to a pressurized water supply. There are several disadvantages to this method which preclude it from serving the same purpose as this invention. Positioning such a device for indoor use for household animals would require extensive plumbing for both the water source and the required discharge pipe which would collect the copious amount of water that would be running while the animal was not drinking. Placement of a discharge pipe in a floor beneath some water source in a household would be largely impractical. Also, the device would not be moveable to another location in the house. Constant dripping of water into the bowl for discharge is a waste of a natural resource and a strain on the household's water bill. Connecting the valve directly to an existing faucet would eliminate the need for a discharge pipe, but would still present the same problem with wasting water. Also, this would not eliminate the habit of the animal jumping up on a counter to drink, but would in fact reinforce this habit. Finally, there is no means to aerate the water.

Similar results and disadvantages apply to U.S. Pat. Nos. 2,775,227 Millies and 2,034,968 Bartlett which disclose a drop delivery type poultry fountain and a poultry drinking fountain, respectively.

Demand system waterers require actuation by the animal users, either with the mouth, nose or an extremity. The following examples all share some disadvantages, and these are presented after the specific references to avoid repetition.

U.S. Pat. No. 3,179,085 McKillip discloses a watering device for hogs where the animal must place his mouth around upper and lower blades and squeeze them together to obtain water from a valve connected to a pressurized water supply.

U.S. Pat. No. 4,924,812 Bernays Jr discloses a water bowl fountain device for pets where a dog or other pet must step on a springloaded platform to activate a valve connected to a pressurized water supply. Activation of the valve produces water flow in an upwardly directed, fountain-like manner into a bowl. Disadvantages particular to this approach are that the weight of the animal must be adequate to activate the device; and the animal may be startled off the platform by the sudden spurt of water, thus stopping the flow.

U.S. Pat. No. 3,831,558 Forbes discloses a water fountain for animals where the animal operates the device by depressing a valve actuator lever in a basin, said basin being supported by a stanchion embedded in the earth and being connected to a water source.

U.S. Pat. No. 3,272,181 Ramsey discloses an animal actuated drinking fountain where dogs obtain water by the conscious application of weight to an operable panel. The panel activates a valve connected to a pressurized water source and this produces an outward water spout. Disadvantages particular to this approach are that it requires more cognitive ability than the Bernays device because a specific area must be activated; and the animal may be startled by the sudden spurt of water.

U.S. Pat. No. 4,573,433 Thompson discloses an activated animal watering valve, especially for dogs, where biting upon the nozzle portion triggers a rivet to open the valve and allow water from a pressurized source to flow into the animal's mouth.

U.S. Pat. No. 4,469,049 Waynick discloses an animal-activated watering device for household pets where an animal standing or resting on a pressure plate activates a valve which allows water to flow into an open reservoir from a pressurized water supply.

U.S. Pat. No. 5,329,876 Tracy, U.S. Pat. No. 4,386,582 Adsit, U.S. Pat. No. 3,459,159 Reed, U.S. Pat. No. 3,901,191 Smith, and U.S. Pat. No. 4,976,220 Gershman all disclose animal waterers or liquid feeders that are comprised of a paddle-wheel type device that is licked by an animal to obtain water or liquid feed. A disadvantage particular to this approach is that it encourages the habit of licking which may translate into a "lick granuloma" dermatitis (skin inflammation) in animals prone to this type of behavior.

U.S. Pat. No. 3,868,926 Olde discloses an automatic water dispenser for animals, particularly poultry, where an outwardly and downwardly directed stream is produced in response to the tilting of a valve by the animal's beak, said valve being connected to a water supply.

Additional prior art that does not substantially depart from the example results discussed here include U.S. Pat. No. 1,278,285 Allen, U.S. Pat. No. 2,510,252 Pine, U.S. Pat. No. 3,505,978 Nilsen and U.S. Pat. No. 3,537,430 Peppler.

The disadvantages of these inventions include:

1) the animal must be trained or learn to use the device
2) the device must be operated by the animal to obtain water
3) several devices must be connected to a water source or pressurized water supply
4) a continuous flow of water is not apparent to the animal
5) there is no means to aerate the water Automatic replenishment waterers are largely motionless, except when being filled, and are kept at a constant level by a float controlled valve. Examples of this type of approach include:

U.S. Pat. No. 3,903,845 Little which discloses a water dispensing dish for animals such as dogs, cats and birds, which is connected to a pressurized water supply line.

U.S. Pat. No. 4,347,809 Gloggler which discloses an automatic drinking bowl system for animals, especially cattle, which is connected to a pressurized water supply line.

The disadvantages to this type of invention are:

1) the device must be connected to a water source
2) a continuous flow of water is not apparent to the animal
3) the device is much like a traditional water bowl which becomes stagnant or stale upon standing. (Stagnation or staleness results from loss of oxygen to the atmosphere). There is no means to aerate the water.

Currently available to the public are devices which maintain a constant level in a pet water dish through the use of an inverted bottle. This does not require a hook-up to a water source, but functions by gravity alone to replace lost water. However, this approach has the remaining disadvantageous cited above, which are a lack of a continuous flow of water and no means to aerate the water.

U.S. Pat. Nos. 2,678,630, 2,726,636, 3,228,377, and 4,022,159 all disclose well known suckling devices for small pets, such as hamsters or gerbils, which use an inverted drinking bottle. Some disadvantages cited previously apply here and they are the training of the animal; operation by the animal; a flow of water is not apparent to the animal; and, there is no means to aerate the water.

Other prior art approaches produce constantly moving water, but for a purpose that significantly departs from the purpose of this invention. U.S. Pat. No. 4,248,177 Peterson et al and U.S. Pat. No. 4,584,966 disclose devices for watering farm animals that use continuously circulating water in conduits as a means to prevent freezing in the winter. U.S. Pat. No. 2,878,781 Wingfield discloses a bath installation in particular for birds wherein an upwardly directed stream of water is produced by activating a connection to a pressurized water source.

A device recently offered to the public by Tranquility Enterprises attempts to solve the problems cited in the first section by providing a running water drinking fountain specifically for cats.

The disadvantages to this approach are:

1) the movement of the water is not in a configuration for which animals have demonstrated a preference. The water flows along a surface at all times and does not fall in a free manner, such as is found with a dripping faucet.
2) this type of water movement does not produce the turbulence or breaking of the surface tension which is necessary to aerate and freshen the water
3) adjustment of the flow to full force causes water to slosh continuously over the edges. This significant leaking could be caused by an animal or small child manipulating or playing with the adjustment piece which is prominently featured at the top of the device.
4) the use of loose objects in the device represent a hazard to animals and small children who might be inclined to swallow the objects.

OBJECTS AND ADVANTAGES

The principal object of this invention is to provide an animal watering device that is more compatible with the desires of an animal for a particular configuration of the drinking water. This configuration is a continuous flow of free falling water, accompanied by movement of water in the receptacle area of the device. By achieving this principal object, other objects automatically provided are an increase in convenience and sanitation for an animal owner, as well as a decrease in annoying habits by an animal. Furthermore, another object is to provide a device that does not require the animal to be trained to use, or activate the device to obtain water. (Some animals, such as cats, are not celebrated for their high degree of "trainability"). Specific advantages of this invention that distinguishes it over the prior art are:

1) a continual flow of water in a free falling manner that is apparent to the animal. This enticement enhances the appeal of the animal's own water supply, so that the animal is not encouraged to seek out other sources of running water such as a faucet. This decreases unwanted behavior and may increase water consumption which is beneficial in some medical conditions;

2) plumbing or connection to a pressurized water supply is not required. Therefore installation and operation is simple and easy;

3) a discharge outlet is not required;

4) the device is portable, it's location limited only by the presence of an electrical outlet;

5) water is not wasted in any manner;

6) the device can be located on the floor, thus helping to eliminate the habit of jumping up on counters for water;

7) the animal is not startled by sudden spurts of water that are produced by self-actuating devices;

8) aeration of the water (replacement of oxygen) eliminates stagnation (loss of oxygen to the atmosphere) so water re-circulating in the device is fresher than standing water; and 9) filtration of the water is simply accomplished through traditional means.

Remaining objects of this invention are to provide a device which is simple and economical to manufacture, of durable construction and made of a material impervious to water so as to increase the useful life of the device, of a low price of sale to the consuming public, and which is practical to clean and maintain. The combination of all of these features, along with their advantages, has not been shown or suggested in the prior art. Accordingly, this invention solves the problems previously cited, including undesirable behavior, owner inconvenience, and inadequate water consumption in urinary disease. Further objects and advantages of the invention will become apparent from a consideration of the drawings and ensuing description.

SUMMARY, RAMIFICATIONS AND SCOPE

The continuous waterfall drinking fountain for animals provides a simple inexpensive solution for animal owners who want to provide running water for their animal so that the animal will keep off of kitchen or bathroom counters, or decrease other objectionable habits related to drinking. The device satisfies the desire for free falling water therefore enhancing water intake by the animal and supporting urinary tract health, while reducing inconvenience for its owner. This is accomplished in a combination which requires a relatively few number of elements. Furthermore the elements may be inexpensively manufactured and easily cleaned. The present and preferred embodiments which were described earlier should not be construed as limiting. Ramifications to those embodiments could exist without departing from the scope of the invention. Those ramifications may include:

1) use by pets not specifically mentioned, such as birds, reptiles, ferrets or horses (in which aeration and filtration of the trough decreases algae formation and frequent emptying and cleaning)

2) use out-of-doors 3) changes in the features of operation such as regulating the water flow rate, providing for battery operation versus electrical powering, providing a timer for an automatic on-off feature if desired, providing for automatic shut-off if the device runs dry, and providing an anti-siphon valve for the present embodiment to prevent overflow in the event of power outage.

4) other suitable, water impervious material which may be used for the construction 5) a reduction in the amount of plastic or other material contained in the invention which could be achieved by providing a simple conduit (perhaps resembling a faucet) extending from a motor device and bending over a water receptacle. This would eliminate the pump housing and one water reservoir.

6) an increase in the water capacity for watering larger animals.

Thus, the scope of the invention should be determined by the appended claims and their legal equivalents, instead of by the specific examples listed here.

BRIEF DESCRIPTION OF THE DRAWINGS

A better understanding of the present invention, including features and advantages, will be gained from the Detailed Description and Claims when considered in connection with the following Figures. Like reference numbers refer to like items throughout the Figures, and:

FIGS. 4a and 4b show a section similar to FIG. 3 as an alternative embodiment of the present invention which incorporates a water level maintenance device;

FIG. 5 shows a perspective view of the preferred embodiment;

FIG. 6 shows a front cross sectional view of the preferred embodiment from reference line 6 as seen in FIG. 5.

REFERENCE NUMERALS IN DRAWINGS

| | |
|---|---|
| 10 container | 12 water transportation device |
| 14 motor | 16 intake tube |
| 18 water reservoir | 20 filter |
| 22 outlet ramp | 24 water flow |
| 26 lid | 28 animal access |
| 30 optimal distance | 32 front compartment |
| 34 rear wall | 36 a&b side walls |
| 38 front wall | 40 rear compartment |
| 42 common wall | 44 groove |
| 46 rear compartment-bottom | 48 a&b rear compartment-edges |
| 50 depression | 52 front compartment-bottom |
| 54 a&b front compartment-edges | 56 base periphery |
| 58 remote reservoir | 60 secondary reservoir |
| 62 level response mechanism | 63 retaining wall |
| 64 transfer pump | 66 inlet tube |
| 68 aperture | 70 inlet tube |
| 72 aperture | 92 preferred embodiment |
| 94 cover | 96 water reservoir |
| 98 flow ramp | 100 drip ramp |
| 102 water receptacle | 104 indented V grooves |
| 106 diamond shaped apertures | 108 partition |
| 110 distance | 112 a,b&c perimeter walls |
| 114 base periphery | 116 aperture |
| 117 aperture | 118 intake tube |
| 119 cap | 120 filter |
| 122 annular ridge | 123 threads |
| 124 rear wall | |

DETAILED DESCRIPTION OF THE PRESENT, ALTERNATIVE, AND PREFERRED EMBODIMENTS

A detailed description of one mode of practicing the present invention is disclosed, along with alternative embodiments, and a preferred version of the present invention. However, it is to be understood the disclosed embodiments are merely examples of ways the invention may be accomplished in various forms. Specific structural and functional details described here are not to be interpreted as limiting, but only as a representative basis for teaching one skilled in the art to variously employ the present invention in any appropriate structure.

Figure 1:
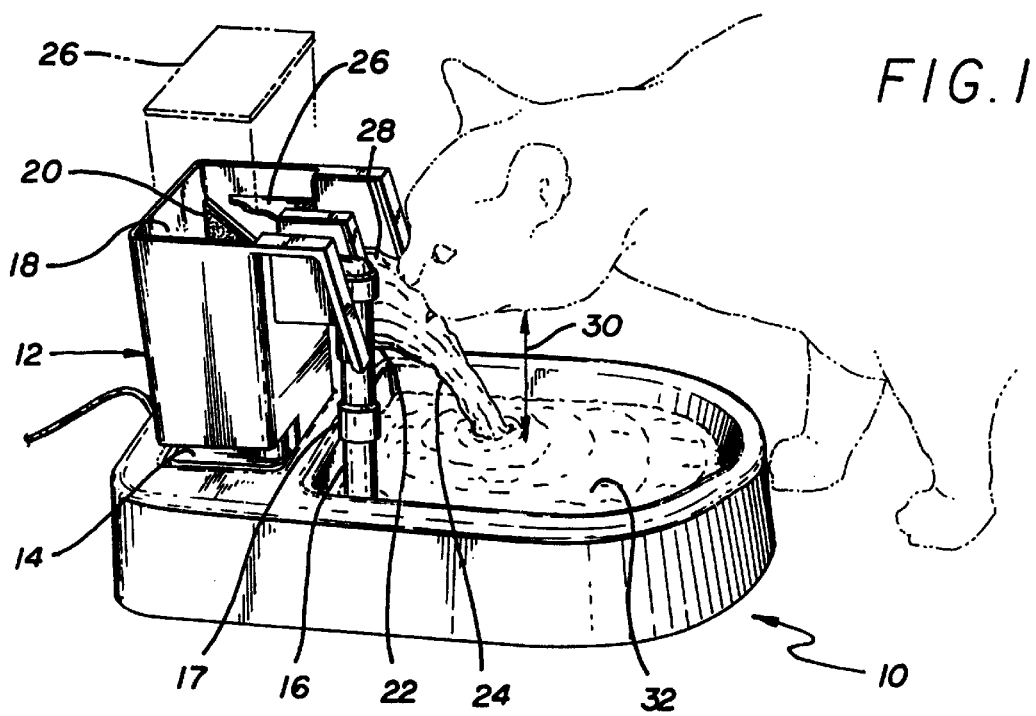
FIG. 1 shows the operation of the invention using the present embodiment.

FIG. 1 illustrates a container securing a device that creates a free falling cascade of water. The container or bowl 10 is fully described in FIGS. 2 and 3. The water transportation device 12 shown here is a traditional aquarium filter of the spill-over type. Device 12 incorporates an electric motor with impeller 14, intake tube 16, water reservoir 18, filter 20, and outlet ramp 22 for water flow 24. A lid 26 over the reservoir is a simple inexpensive option. An animal may drink from the free falling cascade of water as shown by 28. There exists an optimal distance 30 from ramp 22 of the device that creates the waterfall to the top of front compartment 32. Distance 30 is such that it allows animal access to a free falling stream of water. Not shown is a means to adjust water flow 24 by decreasing the diameter of intake tube 16. This may be accomplished by the placement of a standard washer inside tube 16 on an inner ridge of juncture 17. Washers with varying internal diameters may easily be substituted to change the volume of water flow 24. Other means to adjust water flow include, but are not limited to, a standard baffle device incorporated into tube 16, or a motor speed control incorporated into device 12.

Figure 2:
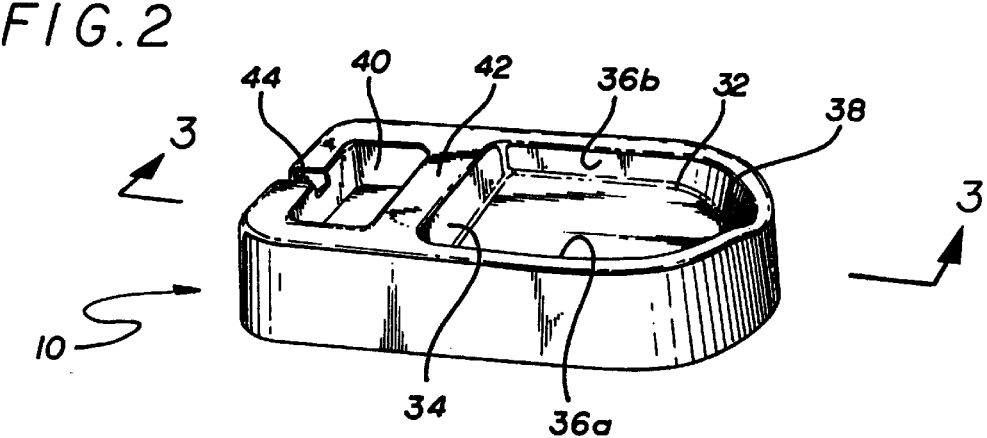
FIG. 2 shows a perspective view of the present embodiment.
Figure 3:
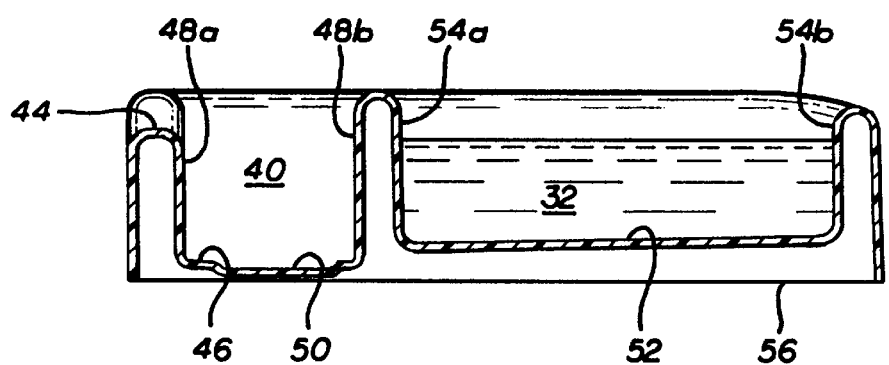
FIG. 3 shows a side cross sectional view of the present embodiment from reference line 3 as seen in FIG. 2.

Referring to FIGS. 2 and 3, there is shown a bowl or container that presently forms the basis for the results of the invention. The present embodiment of the container is generally depicted by numeral 10. The embodiment illustrated may be inexpensively vacuum formed of one sheet or section of an appropriate plastic, and thus is comprised of a single unit. The seamless material provides rounded top edges to prevent injury to the animal that could be possible with angular or sharp edges. Other suitable manufacturing methods, such as injection molding, may be applied. Container 10 is preferably made from plastic such as ABS or polystyrene, but may be made from other suitable materials.

Referring to FIG. 2, the overall configuration of container 10 is defined by a shape embodied by the uppercase letter "D". The configuration of front compartment 32 is also defined by a shape embodied by the uppercase letter "D". That is to say, rear wall 34 runs in a straight line from side wall 36a to opposite side wall 36b, side walls 36a & b run forward in perpendicular fashion from rear wall 34 to at least one half or more the length of front compartment 32, and then curve towards the midline and meet to form a rounded front wall 38. Front wall 38 is scooped so that this wall is slightly lower than the remainder of the periphery of front compartment 32. This feature allows for overfilling of the front compartment, where water flows out of the front compartment and not into the rear compartment where an electrical component may be housed, therefore avoiding submersion of any such component. Front compartment 32 is of a sufficient length to provide animal access to either water falling into the compartment, or water rippling within the compartment. Front compartment 32 has an appearance approximating traditional watering bowls and, as such, is recognizable by animals and their owners. Rear compartment 40 is fully described in FIG. 3. A common wall 42 exists between the two compartments.

Citing FIG. 3, the size ratio between the two compartments are such that front receptacle/reservoir compartment 32 is approximately 3 times the length of rear holding compartment 40. These ratios may be altered according to the desired capacity of front compartment 32.

The depth of compartments 32 and 40 is defined by the height of the perimeter walls, being sufficient for substantial amounts of water (at least three cups or more) to be contained in front compartment 32. Furthermore, this same height causes rear compartment 40 to be deep enough to securely engage a water transportation device that creates free falling water (device 12).

The width of rear compartment 40 is less than the width of front compartment 32, and is defined by the dimensions of device 12 to be secured by rear compartment 40. Rear compartment 40 also provides a groove 44 (best seen in FIG. 2) to accommodate a power cord of device 12.

Rear compartment 40 is a rectangular engagement chamber defined by a flat bottom surface 46 and peripheral edges 48a & 48b, with a top opening of a fixed dimension as a means to secure or hold the waterfall device. Depression 50 in the bottom surface or floor is an option to accommodate the contours of a device that creates the waterfall. Rear compartment 40 comprises walls extending straight upward on all four sides, defining a rectangle having rear and forward walls twice the length of side walls.

Front compartment 32 is a water receptacle and primary water reservoir defined by a flat bottom surface 52, and peripheral edges 54a & 54b, with a top opening of a fixed dimension to provide ample access by an animal to either free falling water or water rippling in the bowl. Front compartment 32 comprises walls extending straight upwards on all sides, defining the confirmation described in FIG. 2.

Base periphery 56 contacts a surface on all sides, providing a stationary feature and aiding in stability of container 10. A wide base resists tipping.

Referring to both chambers in FIG. 3, a primary water reservoir is defined by the dimensions of front compartment 32. A water receptacle is also defined by the dimensions of front comportment 32. A means to hold a traditional device 12, which creates free falling water movement, is defined by the dimensions of rear compartment 40. Both compartments or chambers are easily accessed for cleaning through their open top surfaces.

Alternative embodiments as depicted in semi-schematic FIGS. 4A and 4B add traditional devices to maintain a water level from a remote or from a secondary reservoir such as 58 or 60, respectively. (These descriptions of FIGS. 4A & 4B are incorporated by reference into the descriptions of FIGS. 2 and 3). These embodiments do not alter the result of the present invention, but cause the invention to be more convenient to use. Attention to the water level may be disregarded for a longer period of time, and the animal is assured a minimum amount of water at all times. Remote reservoir 58 in FIG. 4A is comprised of a water level response mechanism 62 mounted within front compartment 32, such mechanism being a float valve or switch to detect changes in water level. Retaining wall 63 protects the switch from activation by a pet trying to play with it, thus preventing flooding. When the water level drops the response mechanism activates a transfer pump 64 that allows water from a remote reservoir 58 to access front compartment 32 through inlet tube 66 and aperture 68. Electrical power for the pump 64 may be provided through any traditional means. Remote reservoir 58 may be located in any appropriate relationship to container 10.

A secondary reservoir 60 in FIG. 4b may consist of a traditional inverted bottle-like container, lacking any mechanical or electrical operation. Secondary reservoir 60 relies on the effects of gravity in which water flows into the primary reservoir of container 10 through inlet tube 70 and aperture 72. Depletion of water in the primary reservoir through use or evaporation allows for the flow of water from secondary reservoir 60.

Either the secondary or remote reservoir adds to the results of this invention, in that the frequency of water replenishment may be greatly decreased or eliminated, therefore increasing convenience for the animal owner.

FIGS. 5 and 6 represent a preferred embodiment of the present invention, and is generally referred to by the numeral 92. Apparatus 92 is a means to practice this invention without container 10, or device 12 secured by container 10. However it is to be understood the results of this embodiment are the same as those of container 10 and device 12 held therein. That is, water is made to enter a pet drinking container in a free falling manner. Apparatus 92 replaces device 12, but incorporates a standard motor with impeller. FIGS. 5 and 6 show one practical embodiment of a single unit which eliminates the need for two units, i.e., container 10 and traditional device 12. This configuration of apparatus 92 is an example, and those skilled in the art may employ variations thereof without detracting from the results of this invention. Apparatus 92 best lends itself to injection formation as a manufacturing method, however other suitable methods could be utilized. Preferable material for apparatus 92 includes plastic, such as ABS or high impact polystyrene. Other suitable materials may be used. Apparatus 92 may be easily disassembled for cleaning.

FIG. 5 is a perspective view of apparatus 92. Cover 94 is located into the main body by inside flanges (not shown) occurring along the side and rear walls of water reservoir 96. Cover 94 may also be formed so that it extends forward and downward to conceal flow ramp 98 and drip ramp 100. Flow ramp 98 and drip ramp 100 are means for water to emerge from reservoir 96 and fall into water receptacle 102. Flow ramp 98 approximates outlet ramp 22 of traditional device 12 and results in similar water flow 24 (all shown in FIG. 1). Drip ramp 100 comprises indented or "V" shaped grooves 104. Aligned with each groove 104 is a diamond shaped aperture 106. Apertures 106 are located in a partition 108, located just behind grooves 104. Partition 108 forms a raised area to restrain a flow of water. Water that emerges from apertures 106 follows grooves 104 and departs drip ramp 100 in a drop-like fashion. The purpose of flow ramp 98 and drip ramp 100 is to provide the animal with a choice of water movement. An animal may have a preference for either a stream of water, or for dripping water similar to a leaky faucet. Having both a stream portion and a drip portion increases the likelihood of an animal drinking from the device. The simultaneous operation of both types of ramps provides a stream of water that would avoid motor strain or restriction (as opposed to operating drip ramp 100 alone). The force of water departing flow ramp 98 may also be adjusted in a manner described for FIG. 1, that is, to vary the internal diameter of the intake tube by a simple means such as a washer, or incorporating a baffle or rheostat. Distance 110 from ramps 98 and 100, to water in receptacle 102, is such that it allows easy access by the animal to free falling water. Access to water flow by the animal is similar to FIG. 1.

The depth of water receptacle 102 is defined by perimeter walls 112 a, b, and c, such depth being sufficient for substantial amounts of water (at least three cups or more) to be contained in receptacle 102. The length of receptacle 102 is also defined by the amount of water to be contained and by the needs of the intended animal users. The shape of receptacle 102 may be rectangular, as shown in FIG. 5, or approximate other shapes such as round or oval. Base periphery 114 contacts a surface on all sides, providing a stationary feature and aiding in stability of apparatus 92. Aperture 116 defines an entrance port for intake tube 118, intake tube 118 being shown in FIG. 6. Aperture 116 leads into a tubular passageway that may continue from receptacle 102 towards the rear of apparatus 92 for a short distance. It may then turn upward at a 90 degree angle.

FIG. 6 is a cross sectional front view of water reservoir 96, intake tube 118, filter 120, annular ridge 122, aperture 116, and water receptacle 102. Below ridge 122 is aperture 117 which provides a port for water to enter reservoir 96 from intake tube 118 and aperture 116. The height of intake tube 118 limits the amount of water which may backflow into receptacle 102 in the event of power disruption. Intake tube 118 is an integral unit containing a threaded area and cap 119 for filter installation at the top of a the aperture end of tube 118. Ridge 122 provides seating for the motor end of tube 118. A standard motor with impeller (not shown) attaches to a threaded underside 123 of ridge 122. An exit port (not shown) in the bottom of rear wall 124 (FIG. 6) accommodates a power cord for a standard motor. Filter 120 is located at the top of the aperture end of intake tube 118, and may be a customized plug for this device, or a standard plug filter such as those used in swimming pool cleaning devices. Filter 120 is preferably composed of charcoal or is carbon-based material for safety and efficacy.

The present embodiment (FIGS. 1–3) and the preferred embodiment (FIGS. 5–6) are operated simply by filling the device with water and providing power to the device (such as plugging a power cord for the motor into an electrical outlet). Alternative embodiments (FIGS. 4a & b) include filling the remote reservoirs with water.

What is claimed is:

1. A watering device for watering animals comprising:
   a) a primary container adapted to hold water, said primary container having a wall defining an opening;
   b) an outlet ramp positioned above said primary container, said outlet ramp being adapted to release water into said opening in said primary container in substantially a free falling manner;
   c) a pump hydraulically connected to said primary container and said outlet ramp for transporting water from said primary container to said water outlet ramp, wherein water is made to substantially free fall from said outlet ramp into said primary container; and
   d) a secondary reservoir and a secondary water passage separate from said outlet ramp and hydraulically connected to said primary container and to said secondary reservoir, wherein said secondary reservoir is adapted to store a non-circulating reserve of water and to allow gravity to cause water to flow from said secondary reservoir through said secondary water passage to said primary container and thereby adding water to said primary container.

2. The watering device of claim 1 wherein the secondary reservoir and secondary water passage are adapted to automatically add water to said primary container when water falls below a predetermined level in the primary container.

3. The watering device of claim 2 wherein the secondary reservoir includes an inverted bottle and the secondary water passage includes a narrowed tubular member extending from the lower end of the bottle into the primary container.

4. A watering device for watering animals comprising in combination:
   a) a primary container for holding water, said primary container having an exterior wall defining an open top for allowing animals to drink water from said container;

b) a tube for transporting water, said tube having a first and second end, said first end being in said primary container wherein said tube may remove water from said container when water is in said primary container;

c) a pump connected to said tube for pumping water from said primary container;

d) a reservoir located above said primary container for holding pumped water, said second end of said tube being positioned to deposit pumped water in said reservoir when said pump pumps water from said primary container;

e) a lip attached to said reservoir which releases water into said primary container from a predetermined height above said primary container, wherein said pumped water is made to substantially free fall into said primary container through said open top; and f) a secondary container hydraulically connected to said primary container wherein said secondary reservoir is adapted to store a non-circulating reserve of water and to allow gravity to cause secondary water to flow from said secondary container into said primary container and thereby add secondary water to said primary container separate from the pumped water deposited by said reservoir and lip into said primary container.

5. The watering device of claim 4 wherein the secondary reservoir has a flow regulator member adapted to cooperate with gravity to automatically add said secondary water to said primary container when water falls below a predetermined level in said primary container.

6. The watering device of claim 5 wherein the secondary reservoir includes an inverted bottle and the flow regulator member includes a narrowed water passage member having a first end section hydraulically communicating with the lower end of the inverted bottle and a second end section hydraulically communicating with the primary container.

7. A watering device for watering animals, comprising in combination:

a) a primary container for storing water in a position where an animal may drink from said primary container, said container having an exterior wall defining an open top;

b) a water release means positioned a predetermined height above said primary container for causing release water to substantially free fall into said primary container in a detached stream through said open top;

c) a fluid transportation means hydraulically connected to said primary container and to said water release device for transporting container water from said container to said water release means; and d) a secondary container and a secondary water passage separate from said water release means and hydraulically connected to said primary container and secondary container wherein said secondary container is adapted to store a non-circulating reserve of water and to allow gravity to cause secondary water to flow from said secondary container through said secondary water passage into said primary container and thereby add secondary water to said primary container.

8. The watering device of claim 7 wherein the secondary reservoir is adapted to cooperate with gravity to automatically add said secondary water from said secondary reservoir to said primary container when container water falls below a predetermined level in the primary container.

9. The watering device of claim 8 wherein the secondary reservoir includes an inverted bottle and a narrowed water passage member having a first end section hydraulically communicating with the lower end of the inverted bottle and a second end section hydraulically communicating with the primary container.

10. A watering device for watering animals comprising:

a) a primary container adapted to hold water, said primary container having a wall defining an opening;

b) an outlet ramp positioned above said primary container, said outlet ramp being adapted to release water into said opening in said primary container in substantially a free falling manner;

c) a pump hydraulically connected to said primary container and said outlet ramp for transporting water from said primary container to said water outlet ramp, wherein water is made to substantially free fall from said outlet ramp into said primary container; and d) a secondary reservoir adapted to store a non-circulating reserve of water and to cooperate with gravity to cause water to automatically flow from said secondary reservoir to said primary container when the water in said watering device falls below a level sufficient to prevent gravity from causing water to exit the secondary reservoir and enter said primary container.

11. The watering device of claim 10 wherein the secondary reservoir includes a narrowed secondary water passage in hydraulic communication with the primary container.

12. The watering device of claim 11 wherein the secondary reservoir includes an inverted bottle and the narrowed secondary water passage includes a narrowed tubular member extending from the lower end of the bottle.

13. A method of watering animals comprising the following steps:

a) transporting water from a container having an exterior wall defining an open top to a water release means, the water release means being located above the container;

b) releasing water from the water release means wherein water is made to fall in a substantially free falling manner into the container through the open top;

c) allowing an animal free access to drink falling water or water in the container, wherein an animal may drink from the falling water;

d) storing water in an inverted bottle secondary reservoir, the secondary reservoir being hydraulically connected to the primary reservoir by a water passage, wherein water stored in the inverted bottle does not circulate; and e) transferring water from the secondary reservoir to the primary reservoir when water in the primary reservoir is below a predetermined level.

14. The method of claim 13 wherein the step of transferring water from the secondary reservoir to the primary reservoir comprises allowing gravity to draw water through the water passage.

* * * * *